United States Patent
Degesne

(10) Patent No.: US 7,520,705 B2
(45) Date of Patent: Apr. 21, 2009

(54) METHOD FOR GROOVING THE BORE OF A TUBE AND GROOVING TOOL-HOLDER

(75) Inventor: Denis Degesne, Bourges (FR)

(73) Assignee: Giat Industries, Versailles (FR)

( * ) Notice: Subject to any disclaimer, the term of this patent is extended or adjusted under 35 U.S.C. 154(b) by 620 days.

(21) Appl. No.: 10/512,695

(22) PCT Filed: Apr. 29, 2003

(86) PCT No.: PCT/FR03/01337

§ 371 (c)(1),
(2), (4) Date: Oct. 27, 2004

(87) PCT Pub. No.: WO03/092941

PCT Pub. Date: Nov. 13, 2003

(65) Prior Publication Data

US 2005/0229759 A1 Oct. 20, 2005

(30) Foreign Application Priority Data

Apr. 29, 2002 (FR) .................................. 02 05361

(51) Int. Cl.
*B23D 37/04* (2006.01)
(52) U.S. Cl. .................. 409/259; 407/19; 409/268; 409/287
(58) Field of Classification Search ............... 409/244, 409/287, 259–261, 268; 407/18, 19; *B23D 37/04, B23D 37/10, 37/16*
See application file for complete search history.

(56) References Cited

U.S. PATENT DOCUMENTS

| | | | | | |
|---|---|---|---|---|---|
| 1,197,132 | A | * | 9/1916 | LaPointe | 407/16 |
| 1,310,934 | A | * | 7/1919 | Suverkrop et al. | 409/244 |
| 1,548,451 | A | * | 8/1925 | Fry | 407/18 |
| 1,713,390 | A | * | 5/1929 | Lundell | 407/18 |
| 1,925,837 | A | * | 9/1933 | Jones et al. | 409/260 |
| 2,330,863 | A | * | 10/1943 | Bonnafe | 409/244 |
| 2,408,521 | A | * | 10/1946 | Lapointe | 409/249 |
| 3,221,608 | A | * | 12/1965 | Russel | 409/260 |
| 3,847,056 | A | * | 11/1974 | Roger | 409/59 |
| 4,294,568 | A |  | 10/1981 | Lipowsky et al. | |
| 4,411,569 | A |  | 10/1983 | Pizzola | |
| 4,985,609 | A |  | 1/1991 | Hofele | |
| 6,644,358 | B2 | * | 11/2003 | Demarest et al. | 138/177 |

FOREIGN PATENT DOCUMENTS

| | | |
|---|---|---|
| DE | 1 752 709 | 7/1971 |
| EP | 0 739 674 A2 | 10/1996 |
| GB | 1 367 980 | 9/1974 |

* cited by examiner

*Primary Examiner*—Daniel W Howell
(74) *Attorney, Agent, or Firm*—Oliff & Berridge, PLC

(57) ABSTRACT

A process to produce alternately concave and convex grooves that are evenly spaced inside a tube, wherein the process includes the steps of at least one simultaneous broaching stage for all the grooves of the tube using at least one roughing tool and/or at least one finishing tool, the tools made integral with a handle bar using a link, the different roughing tools being implemented successively and having a convex profile that gradually approaches the concave profile of the grooves, and at least one finishing tool having a concave profile to make the convex profile of the grooves.

4 Claims, 5 Drawing Sheets

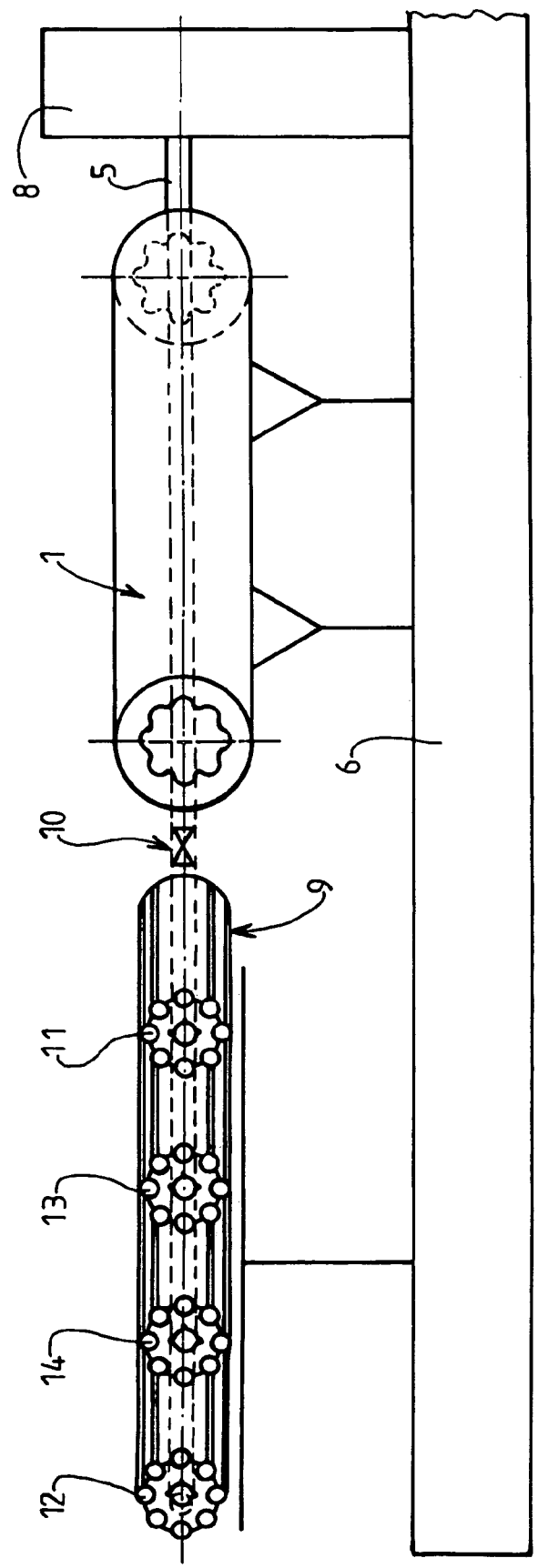

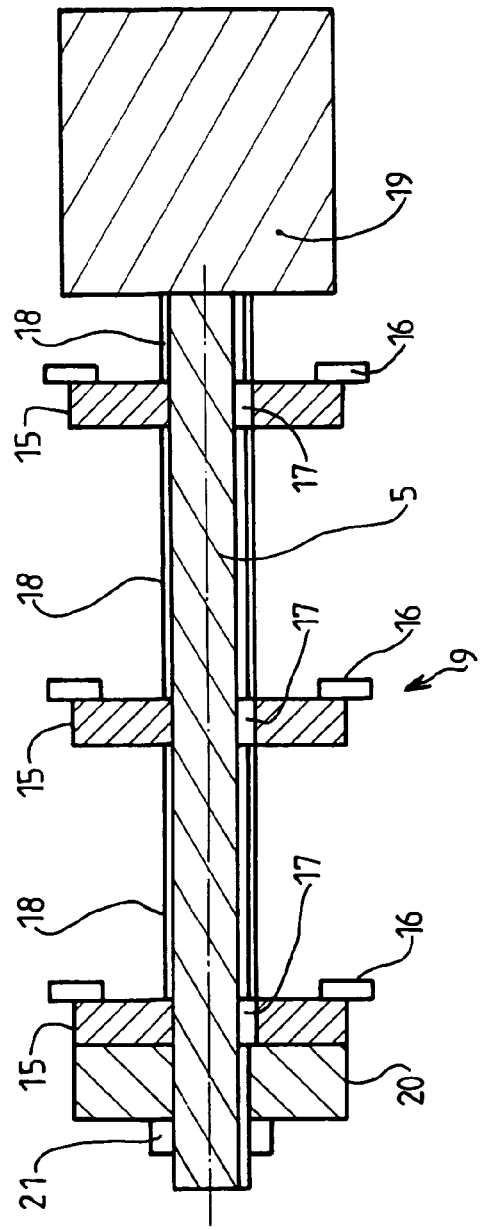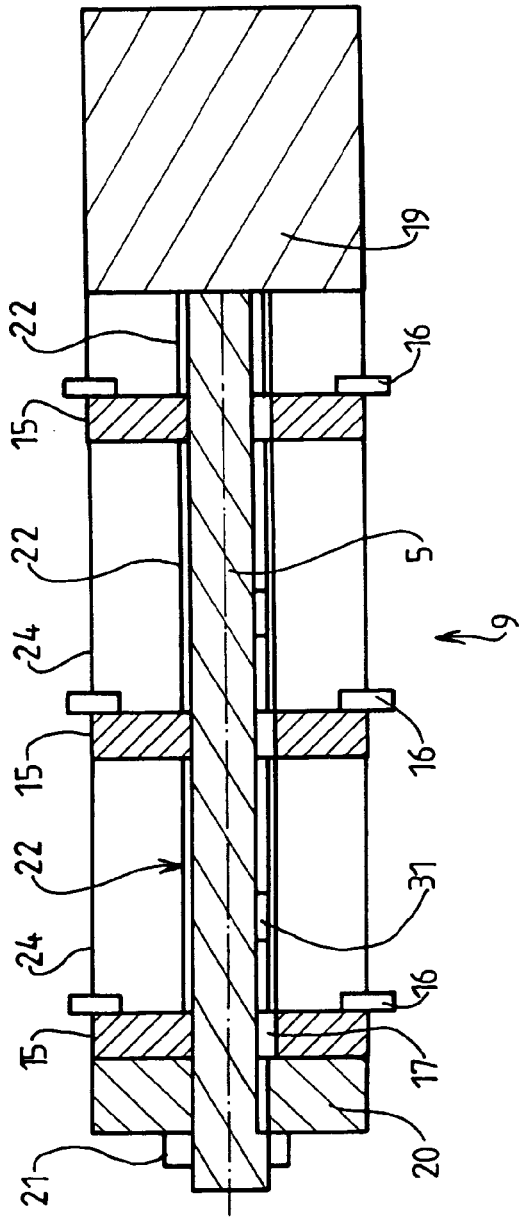

METHOD FOR GROOVING THE BORE OF A TUBE AND GROOVING TOOL-HOLDER

BACKGROUND

The invention relates to a method of shaping and threading the inner wall of tubes and, more particularly, thermal exchanger tubes made of materials having high mechanical properties.

There exists a process to broach grooves onto the external wall of a cylinder (U.S. Pat. No. 4,294,568). According to this process, two adjacent grooves are simultaneously broached. One groove is broached by using a roughing tool and the other groove is broached by using a finishing tool. The roughing tool has a staggered profile and the finishing tool matches the final profile of the groove. If this process enables grooves to be made that have a complex profile, the process cannot be adapted to the simple and fast production required with complex rifling on the inside of a tube.

U.S. Pat. No. 4,411,569 also discloses a broaching process for the rifling of a gun barrel in which several broaches are axially joined to a rod while being free to rotate. The traction of the rod machines the grooves. Each broach has a different profile: the first broach ensures a rough machining and the last broach ensures the finishing. The drawback to this process lies in that it can only be used to produce a groove with a simple profile. The process cannot be used to make a groove having a complex profile covering the entire internal surface of the barrel and comprising a succession of concave and convex profiles.

SUMMARY

The present invention thus, among other things, economically produces the internal profile of a tube (namely a metallic tube having high mechanical properties (made of refractory steel, for example)) which is complex in shape (namely comprising a succession of grooves with a concave profile separated by convex profiles).

According to an exemplary aspect of the disclosure, a method of alternately producing concave and convex grooves that are evenly spaced inside a tube includes broaching all the grooves of the tube simultaneously using at least one roughing tool or at least one finishing tool, wherein the at least one roughing tool or at least one finishing tool is integral with a bar using a link, the at least one roughing tool being implemented successively and having a convex profile that gradually approaches a concave profile of the grooves and the at least one finishing tool having a concave profile to make a convex profile of the grooves.

BRIEF DESCRIPTION OF THE DRAWINGS

Other characteristics, particulars and advantages of the invention will become more apparent from the description hereafter given by way of illustration and in reference to the drawings, in which:

FIG. 3 is a section illustrating an embodiment of a tool holder, FIG. 4 illustrates another embodiment of the tool holder.

DETAILED DESCRIPTION OF PREFERRED EMBODIMENTS

Figure 1:
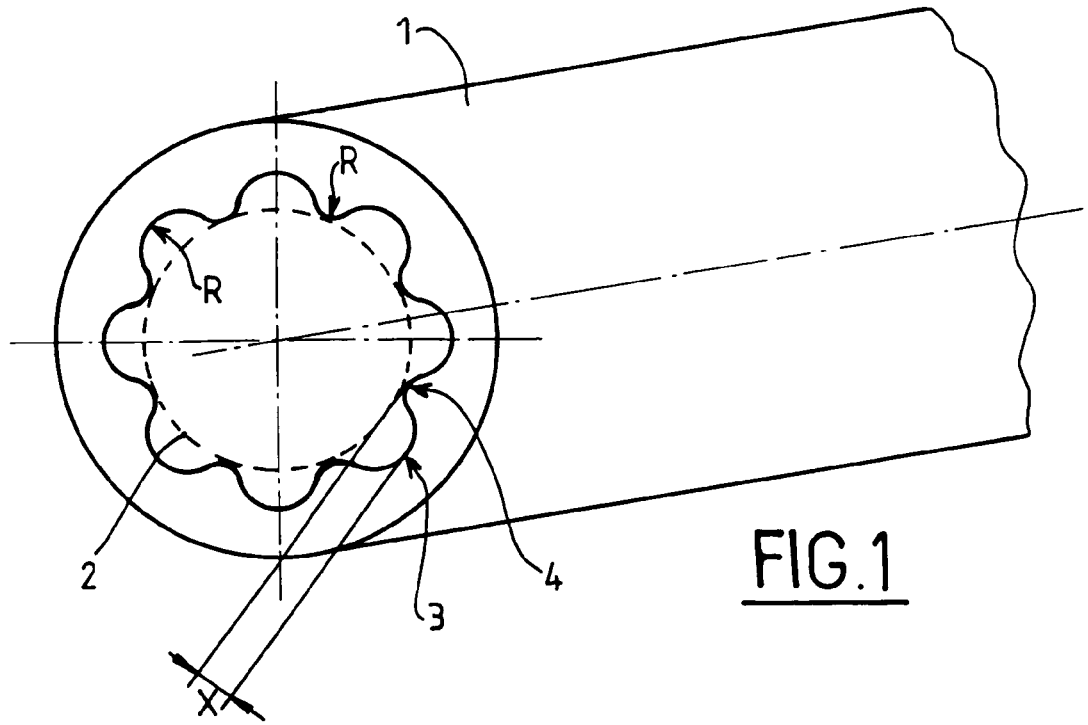
FIG. 1 shows the grooving profile of a tube obtained using the process according to the invention, FIG. 2 schematically shows a machine tool enabling the process according to the invention to be implemented.

FIG. 1 partially shows a tube 1 (for example a metallic tube of a thermal exchanger with high mechanical properties) made of refractory steel, for example.

The tube 1 is first pierced following a substantially cylindrical profile 2. The final grooving profile incorporates a succession of concave-profiled grooves 3 separated by convex-profiled crests 4. The global profile obtained in accordance with the invention has the particularity of covering the whole internal surface of the tube 1. The grooves 3 and crests 4 here have a circular profile with a radius R. The maximum depth X of the grooves 3 is less than or equal to 2R. It is naturally possible for profiles to be produced that have a different radius for the concave grooves and the convex crests.

It goes without saying that the grooves 3 may be made along a generating line of the tube 1 at an angle that is nil or different from zero with respect to the generating line so as to be straight or helicoidal. In the first case, the tool has a translational movement and in the other, both a translational and rotational movement. In the latter case, the teeth of the offset tool will be inclined at an angle equal to the angle of the helicoidal groove with respect to the tube generating line.

FIG. 2 schematically shows a machine tool enabling the process according to the invention to be implemented. The machine comprises a bed 6 onto which the cylindrical tube 1 to be threaded is flanged. The bed 6 incorporates a bar 5 connected to a bar holder head 8 of the machine enabling a multiple tool holder 9 to be drawn through the cylindrically pre-bored tube 1. The multiple tool holder 9 is attached to the bar 5 that is linked to the bar holder head 8 using a quick link 10. The multiple tool holder 9 incorporates at least one roughing offset tool 11 and one finishing offset tool 12 to make the grooves 3 in the tube 1.

The tool holder 9 also incorporates intermediate offset tools 13 and 14 enabling the move from roughing to finishing. Naturally, the other components of the machine are known, and namely those devices used to pull the tool 9, and it is thus unnecessary for them to be described more fully.

FIG. 3 shows a first embodiment of a multiple tool holder 9, for example carrying roughing offset tools. By way of example, the multiple tool holder 9 incorporates three offset tools 15 each provided with several tips 16. Each offset tool 15 is made integral in rotation with the bar 5 by means of a cleat 17. The offset tools 15 are also linked in translation by spacers 18 in the shape of smooth tubes, and the assembly is placed between two guiding/centering ways 19 and 20. A nut 21 blocks the assembly with respect to the bar 5.

The first guiding/centering way 19 is formed by a part prolonging the bar 5, the second guiding/centering way 20 is formed by a ring. The guiding/centering ways 19 and 20 have an outer diameter substantially equal to the initial diameter of the tube 1. The two guiding/centering ways 19 and 20 ensure the guidance of the tool holder 9 in the tube 1 to be threaded. In a known manner, cutting fluid is injected, for example through the bar 5 and the spacers 18 by holes, not shown.

Figure 5:
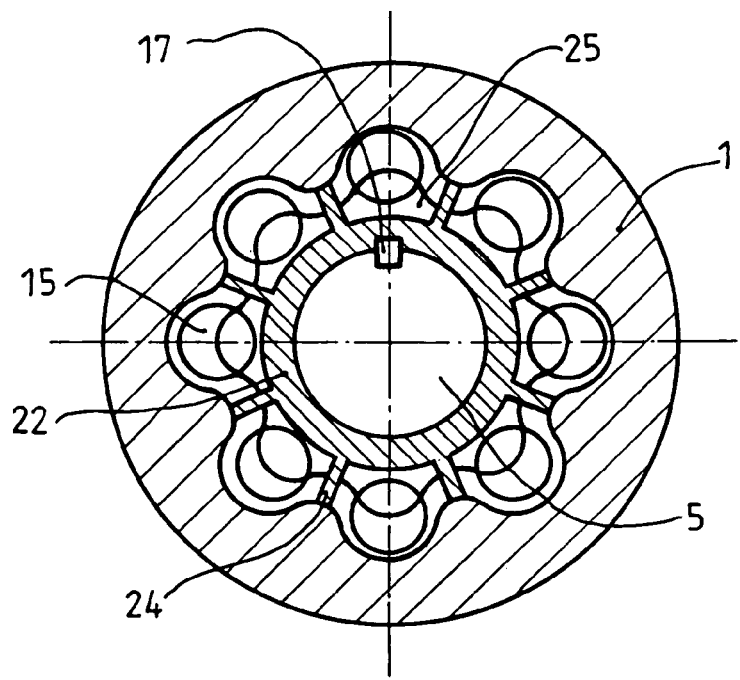
FIG. 5 is a cross section of a tool holder in accordance with FIG. 4.
Figure 6:
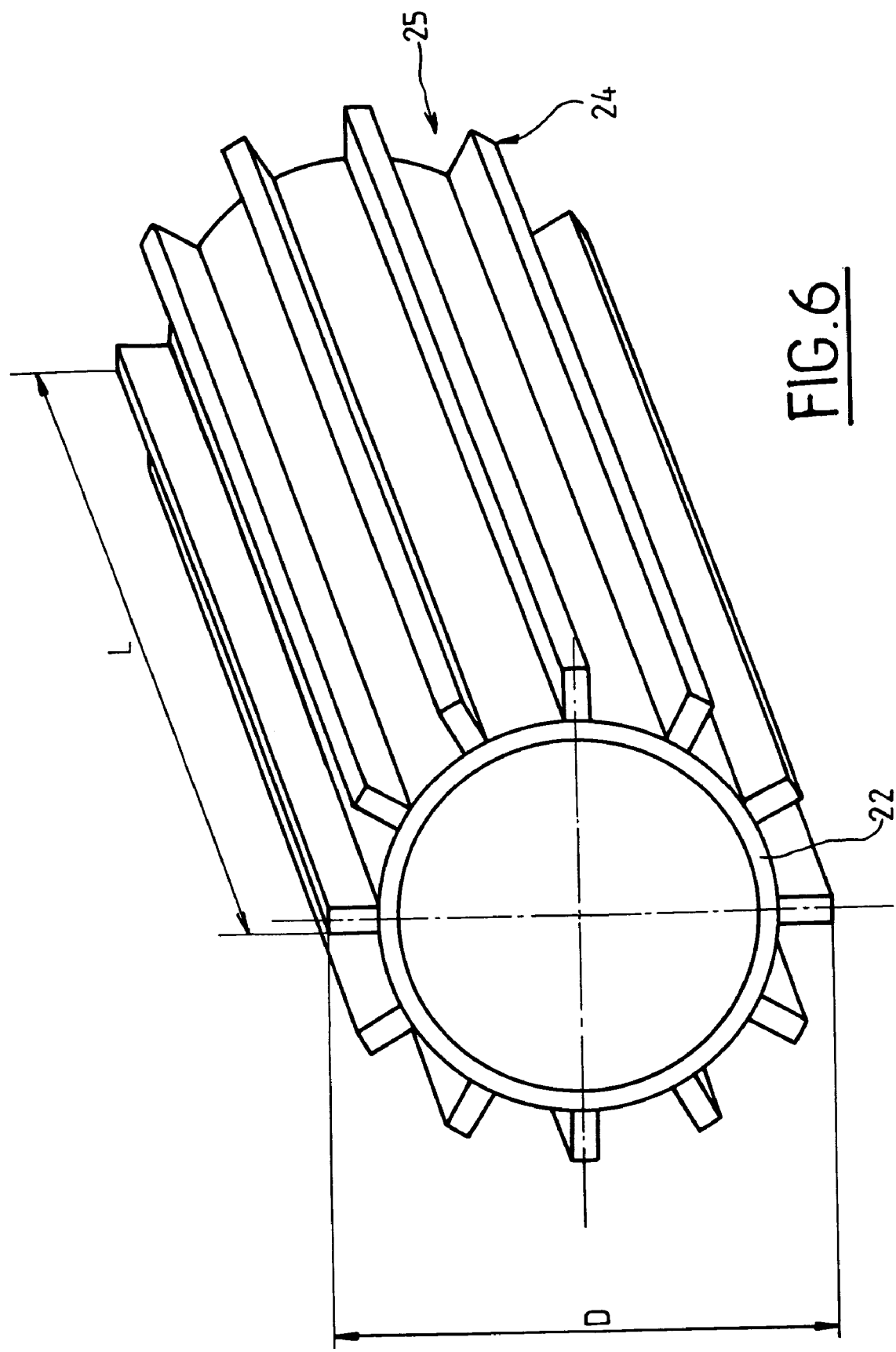
FIG. 6 shows a view of a spacer used in the invention.

Another embodiment is illustrated in FIGS. 4, 5 and 6. In this embodiment, the smooth spacers 18 are replaced by spacers 22 comprising a tube having radial vanes 24 delimiting a housing 25 between each vane 24. Each housing 25 receives the shavings machined by the tip or cutting profile of the tool placed between the two vanes 24 delimiting the housing 25.

This avoids shavings generated during the grooving operation from accumulating in the lower part of the tube 1 and deteriorating a surface of the tube 1. The spacers 22 are positioned angularly with respect to the tool 9 by cleats 31 such that each tip or cutting profile of the tool 9 is positioned between two successive vanes 24.

The vanes 24 are of a width such that they come into contact with the internal surface of the tube 1 before the grooves are machined. Thus, the vanes 24 press against the crests of the convex profiles and delimit the housings 25 to receive the shavings.

In this embodiment, as many vanes 24 are provided as grooves 25. It goes without saying that the number of vanes 24 can be reduced. The length L of the spacer 22 depends on the length of the bore to be grooved and on the number of offset tools 15 fastened on the bar 5, which should be easily determined.

Figure 7:
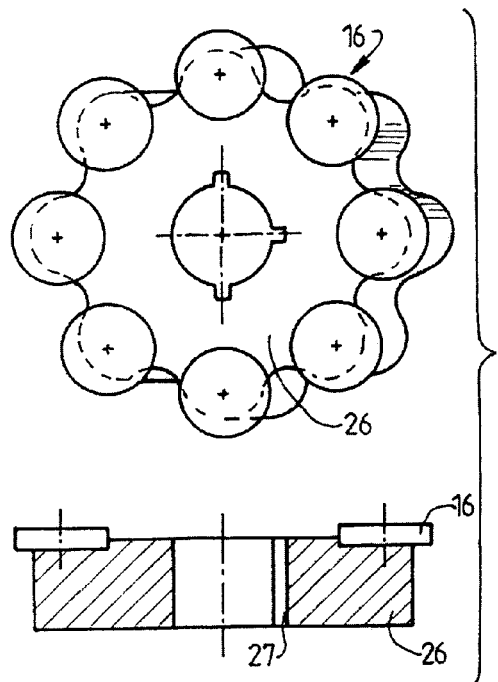
FIGS. 7 to 9 show different possible offset tools.
Figure 8:
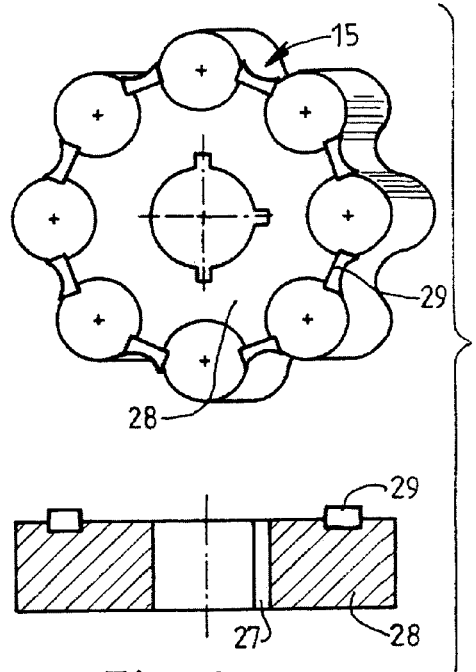
Figure 9:
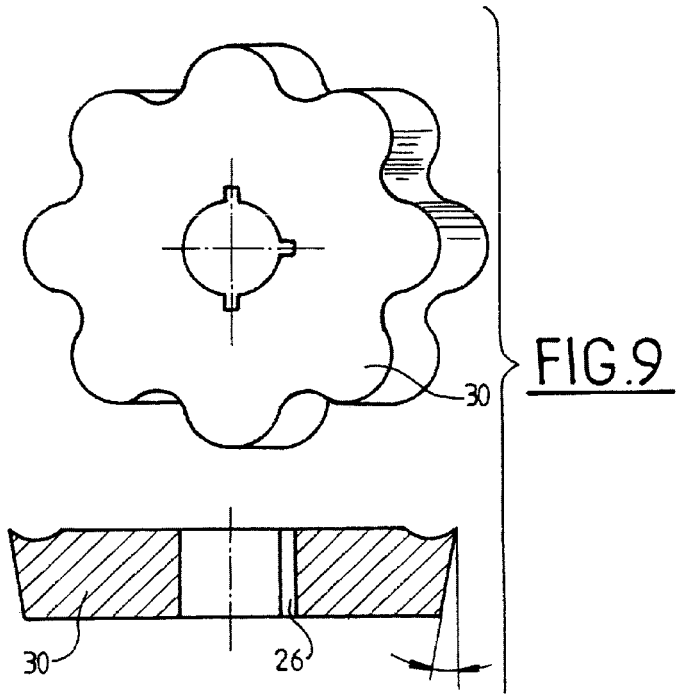

FIGS. 7 to 9 show different offset tools able to be used in the invention: the upper view being a cross section and the lower view being a vertical section. The tool 26 show in FIG. 7 is a roughing tool fitted with 8 convex circular tips 16 of tungsten carbide having a housing 27 for a cleat. These tips 16 enable a concave shape to be given to the groove 3.

The tool 28 shown in FIG. 8 is a finishing offset tool 15 equipped with 8 concave tips 29. These tips 29 enable a convex crest 4 to be given to the grooves. As before, the tool 28 has a housing 27 intended for a cleat. As should be appreciated, the tips 16, 29 are fastened by any fastening currently available or later developed, not shown, (for example by screwing). As such, at least one tool 26 or 28 (roughing or finishing) has at least one tip 16 or 29 enabling the concave or convex profile of the grooves to be produced. Furthermore, each tip 16 or 29 making the concave or convex profile may be circular and have a radius equal to the groove that must be machined.

The tools according to FIGS. 7 and 8 are preferably used to groove tubes with a wide internal diameter, for example 5 over 38 mm.

FIG. 9 shows a single-piece tool 30 preferentially used to groove small diameter tubes, for example less than 38 mm.

As should be appreciated, the number of offset tools to mount on the bar 5 depends on the traction capability of the machine tool, the mechanical properties of the tube material (machinability) and of the shaving surface taken off at each pass. By way of an example, a machine developing 7 tons of traction can draw 1 to 6 tools.

According to the geometry of the tube to be machined (initial diameter, depth and number of grooves) a tool holder will need to be used incorporating more or less numerous offset tools of different types (roughing, finishing, concave or convex).

Thus, for a tube having shallow grooves (less than or equal to 5 mm) a tool holder ensuring the roughing and finishing in a single pass may be used. The first offset tools carried by this tool holder will be the roughing offset tools for the concave profile, the last offset tool will be finishing tools for the convex profile.

For a tube having grooves of greater depth (over 5 mm), several assemblies of tool holders will be needed. The first machining passes will be made with tool holders fitted only with roughing tools for the concave profile.

The last passes will be made with tool holders fitted only with tools (roughing then finishing) machining convex profiles.

By way of example, to produce a grooved bore such as that shown in FIG. 1 (8 grooves of a radius of 5 mm for a depth X of 10 mm made in a tube having a 40 mm diameter smooth bore), 100 offset tools will be needed each carrying 5 mm radius tips, such offset tools for which the relative positions of the tips will be radially displaced with respect to one another so as to ensure a machining pitch of 0.1 mm at the radius between two successive tools.

The final profile will be obtained, from the initial smooth bore, by 50 passes of a tool holder 9 incorporating 1 to 6 offset tools having ever-increasing cutting diameters from one end to the other of the bar.

As should be appreciated, the number of tools should be selected that is compatible with the power of the machine drawing the tool holder bar.

Note, for example, that for the first machining passes when a small surface is shaven off by each offset tool, a maximum number of tools on the tool holder may thus be used.

For the last passes, when a large shaving is removed at each pass, the machine is under greater strain and the number of tools carried by the traction bar will be reduced.

Machining the convex forms will be carried out after the concave profile has been produced by the passage of a mill fitted with 4 concave shaped tools having ever-increasing relative cutting diameters from one end to the other of the bar 5.

Advantageously, the bar 5 can be made to move in translation so as to create longitudinal grooves or can be made to move in translation and in rotation so as to create helicoidal grooves.

The pitch of the grooves thus obtained depends on the spin rate of the bar with respect to its forward movement. This type of groove may easily be made by a numerical control suitably programmed with the ratio of the bar spin rate over a forward motion.

According to an exemplary aspect of the invention, an internal profile of a complex shape can be made.

According to another exemplary aspect of the invention, grooving tubes of a substantial length (2 to 6 m) can be produced.

According to another exemplary aspect of the invention, the required profile can be economically produced.

The invention claimed is:

1. A tool holder for producing grooves inside a tube, comprising:
    at least two offset tools integral with a bar and separated by at least one spacer, wherein:
    the at least two offset tools includes at least one roughing tool or at least one finishing tool that is integral with the bar using a link, the at least one roughing tool having a convex profile to make a concave profile of the grooves and the at least one finishing tool having a concave profile to make a convex profile of the grooves, and
    each spacer comprises a tube having radial straight vanes delimiting housings.

2. The tool holder according to claim 1, wherein the radial straight vanes are of a width such that they come into contact with an internal surface of the tube before the grooves are machined.

3. The tool holder according to claim 1, wherein each spacer is integral in rotation with the bar.

4. The tool holder according to claim 1, wherein the tool holder incorporates at least two offset tools having at least one convex profile.

* * * * *